United States Patent [19]

Dolphin

[11] Patent Number: 5,226,657
[45] Date of Patent: Jul. 13, 1993

[54] VEHICLE TOWING MEANS

[76] Inventor: William A. Dolphin, 1030 W. 14th St., Pueblo, Colo. 81003

[21] Appl. No.: 726,772

[22] Filed: Jul. 8, 1991

[51] Int. Cl.$^5$ .............................................. B60D 1/155
[52] U.S. Cl. ............................ 280/478.1; 280/491.1; 280/498
[58] Field of Search ............... 280/490.1, 478.1, 479.1, 280/491.1, 491.2, 493, 496, 498, 501

[56] References Cited

U.S. PATENT DOCUMENTS

| | | | |
|---|---|---|---|
| 2,327,308 | 8/1943 | Johnston | 280/490.1 X |
| 2,328,343 | 8/1943 | Jacob | 280/490.1 |
| 2,493,405 | 1/1950 | Hedgpeth | 280/490.1 X |
| 3,035,856 | 5/1962 | Mleczko et al. | 280/477 X |
| 3,235,284 | 2/1966 | Yant | 280/490.1 X |
| 3,282,365 | 11/1966 | McReynolds | 280/478.1 X |
| 3,843,163 | 10/1974 | Hale | 280/490.1 |
| 4,113,272 | 9/1978 | Sebby | 280/490.1 X |
| 4,194,755 | 3/1980 | Youngblood | 280/491.3 X |

Primary Examiner—Margaret A. Focarino
Assistant Examiner—Kevin Hurley
Attorney, Agent, or Firm—Phillip A. Rein

[57] ABSTRACT

This invention is a vehicle towing means to be readily mounted between a towing vehicle and a towed vehicle requiring a minimum amount of effort, strength, and skill for doing so. The vehicle towing means includes 1) a main support assembly releasably connectable to the towing vehicle; 2) a connector linkage assembly pivotally connected to the main support assembly and having a linkage tube member releasably connectable to the towed vehicle; 3) a main actuator assembly mounted between the connector linkage assembly and the main support frame operable to raise and lower a portion of the towed vehicle; and 4) a towed vehicle connector member secured to the towed vehicle operable to releasably receive the connector linkage assembly mounted thereon. The main actuator assembly includes a hitch actuator assembly having a screw actuator member to increase and decrease the distance between an outer end of the connector linkage assembly and the main support assembly for raising and lowering a portion of the towed vehicle for an efficient and effective towing operation. A plurality of lock pin members are provided to secure the vehicle towing means in a safe and efficient manner during a towing operation.

7 Claims, 2 Drawing Sheets

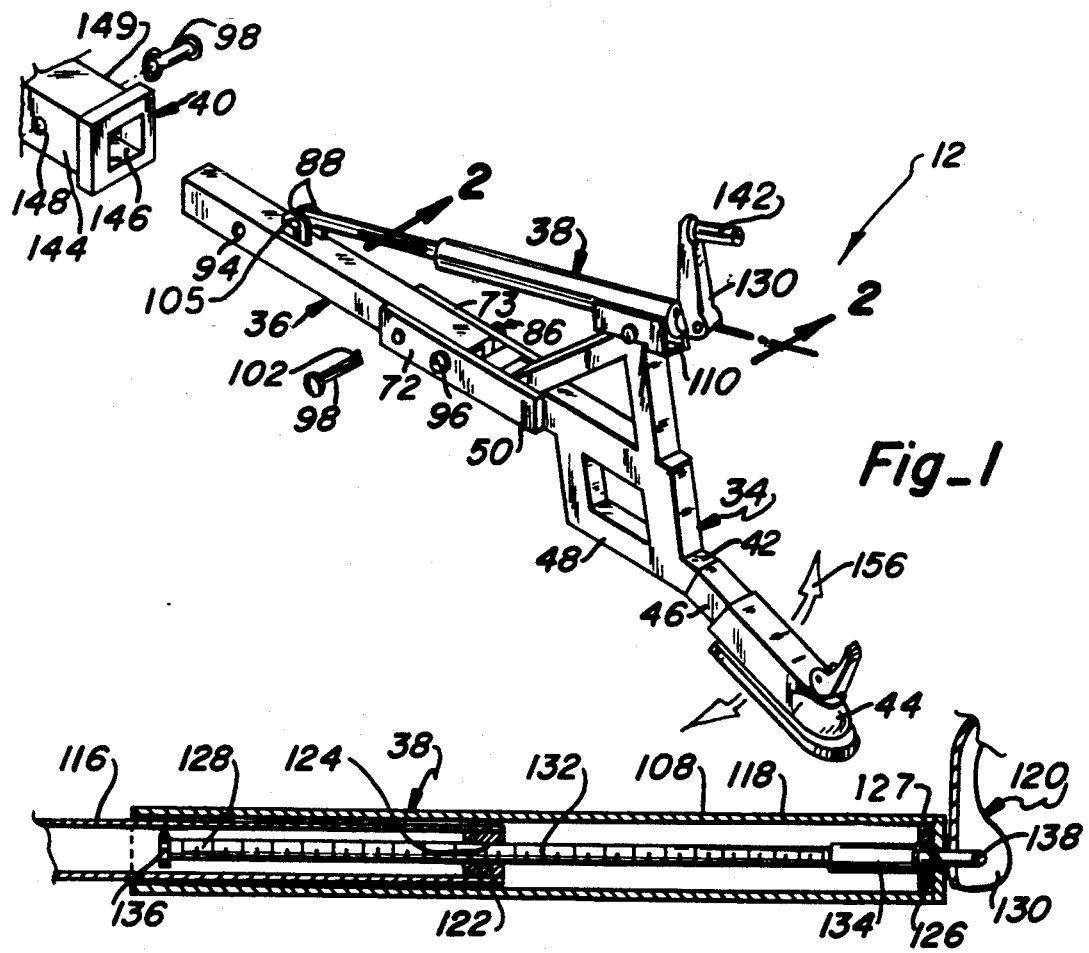
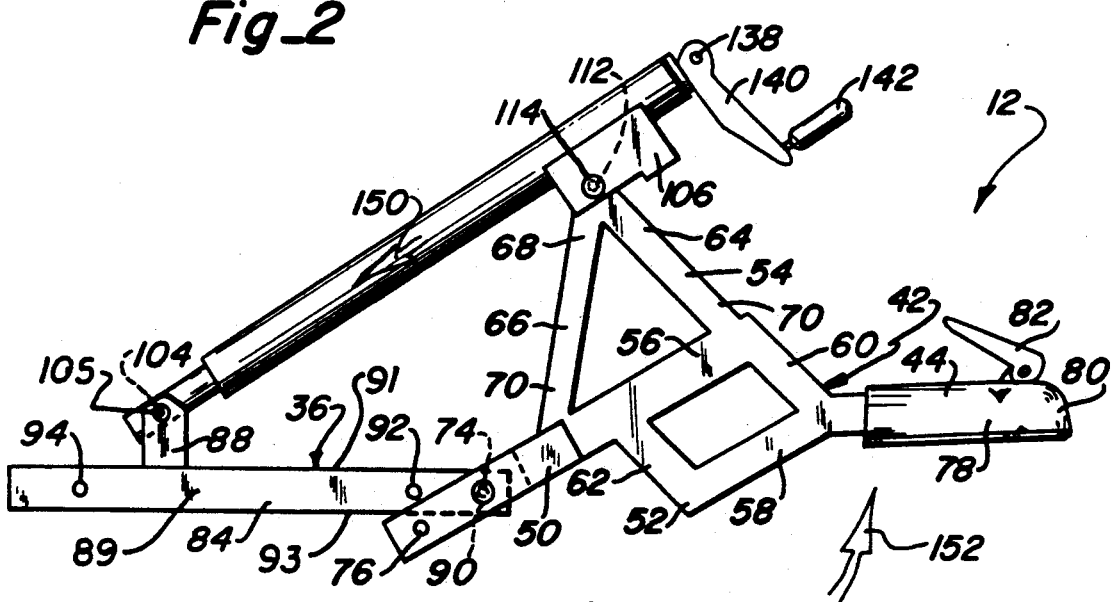

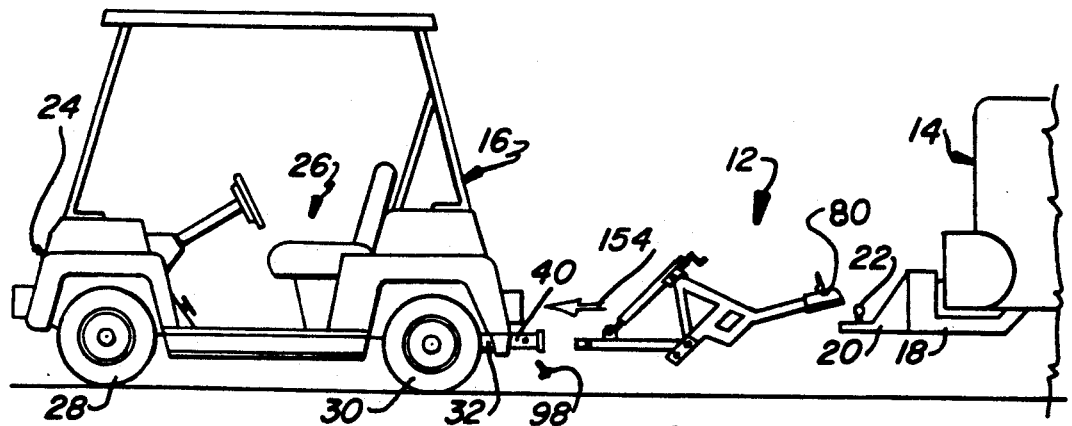
Fig_4
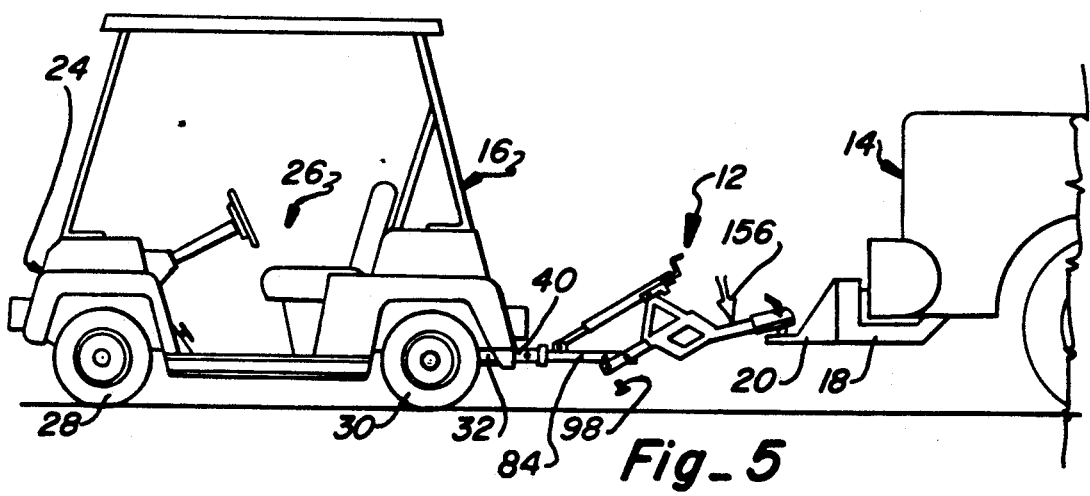
Fig_5
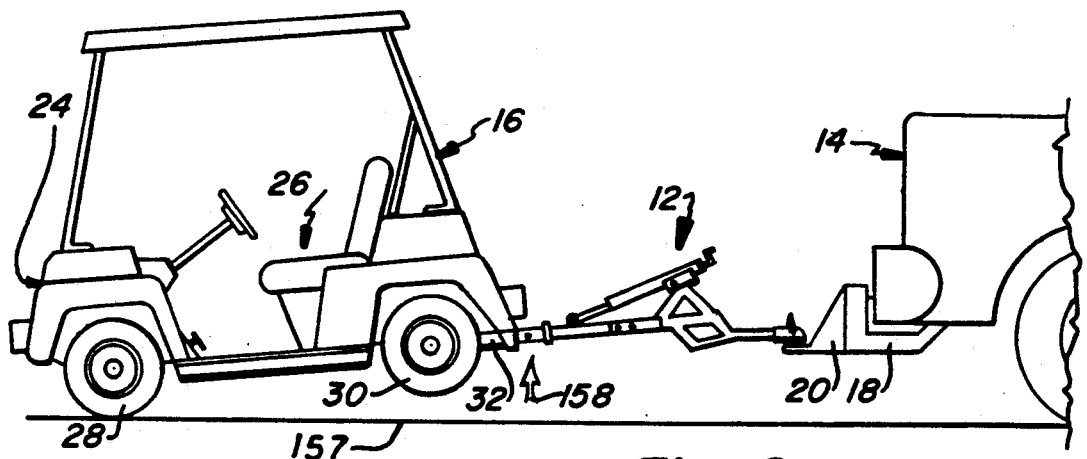
Fig_6

VEHICLE TOWING MEANS

PRIOR ART

A patent search on this invention revealed the following U.S. Patents:

| U.S. Pat. No. | Invention | Inventor |
|---|---|---|
| 3,035,856 | LOAD LEVELER ADJUSTABLE TRAILER HITCH BAR | Mleczko et al |
| 3,282,365 | SELF-PROPELLED GOLF CART | Lowell R. McReynolds |
| 3,490,789 | LOAD EQUALIZING HITCH ASSEMBLY | John O. Stewart |
| 3,645,560 | HITCH EXTENSION MEANS | Merrell D. Steele |
| 3,843,163 | ADJUSTABLE TRAILER HITCH | William B. Hale |
| 3,897,085 | VEHICLE TOWING ASSEMBLY | Roy E. Hawkins |
| 4,113,272 | TOW BAR WITH TOWED VEHICLE SUSPENSION FEATURE | Carl M. Sebby |
| 4,194,755 | TOW BAR FOR VEHICLES | John W. Youngblood |
| 4,333,665 | DETACHABLE TRAILER HITCH | Paul D. Haddock |
| 4,622,647 | VEHICLE HITCH ASSEMBLY | Larry J. Calvert |

The Mleczko et al, Hale, and Youngblood patents disclose use of threaded screw structures for elevation of a trailer structure for load leveling and the like.

The McReynolds patent discloses a self-propelled golf cart teaching attachment of a golf cart to a hitch ball on a towing vehicle. A hydraulic piston and cylinder is used to elevate a front portion of the golf cart to reveal a trailer hitch secured to the golf cart.

The Stewart patent discloses use of a worm gear structure for equalizing a load on a hitch assembly.

The Steele and Hawkins patents disclose use of hydraulic jack structures to elevate a front portion of a trailer for attachment to a hitch ball.

The Sebby patent discloses a tow bar with a linkage structure using a hydraulic piston and cylinder as a jack. An interconnected linkage assembly, on activation of the hydraulic jack, is operable to place a socket hitch assembly onto a hitch ball connected to a towing vehicle.

The Haddock patent discloses a detachable trailer hitch structure for towing two boats at the same time.

The Calvert patent discloses a vehicle hitch assembly providing for vertical height adjustment and selective use of hitch balls of different sizes.

PREFERRED EMBODIMENT OF THE INVENTION

In one preferred embodiment of this invention, a vehicle towing means is operable to be mounted between and attached to a towing vehicle and a towed vehicle which may be a golf cart assembly. The towing vehicle has a ball hitch assembly with a hitch ball member to which the vehicle towing means is attached. The golf cart assembly has a bumper support frame to which another portion of the vehicle towing means is connected.

The vehicle towing means includes 1) a main support assembly; 2) a connector linkage assembly connected to the main support assembly; 3) a main actuator assembly mounted between the main support assembly and the connector linkage assembly to achieve pivotal movement therebetween; and 4) a towed vehicle connector member which is mounted on the towed vehicle and releasably attachable to a portion of the connector linkage assembly.

The main support assembly includes a support frame assembly having a hitch connector assembly which is releasably attachable to the hitch ball member on the towing vehicle.

The connector linkage assembly includes a linkage tube member pivotally connected by a connector assembly to the support frame assembly and having actuator support lugs operable to be interconnected to the main actuator assembly.

The main actuator assembly includes an actuator support housing pivotally connected to the support frame assembly and a hitch actuator assembly mounted between the actuator support lugs on the connector linkage assembly and the actuator support housing.

The hitch actuator assembly comprises a first movable screw housing having a second stationary screw housing connected thereto and operable through an actuator screw assembly to achieve axial telescoping movement so as to pivot the connector linkage assembly relative to the main support frame assembly to achieve an elevated movement of a wheel and axle assembly of the golf cart assembly for a towing function.

The vehicle towing means is provided with lock pin members to secure the golf cart assembly to 1) the towed vehicle connector member; and 2) the connector linkage assembly relative to the main support assembly during a towing operation for safety purposes.

OBJECTS OF THE INVENTION

One object of this invention is to provide a vehicle towing means which can be readily attached and detached from a towing vehicle and its connection to a towed vehicle and providing means for safely pulling subject towed vehicle.

Another object of this invention is to provide a vehicle towing means which can be attached to a ball hitch assembly on a towing vehicle at one end thereof and, at an opposite end, to a golf cart assembly, is operable to elevate a wheel and axle assembly on the golf cart assembly, and can be readily attached by one person without special tools, skill, or strength necessary.

One other object of this invention is to provide 1) a vehicle towing means having a main support assembly connectable to the towed vehicle; 2) a connector linkage assembly pivotally connected to the main support assembly and connectable to the towed vehicle; and 3) a main actuator assembly mounted between the connector linkage assembly and main support assembly in order to raise and lower a wheel and axle assembly of the towed vehicle.

One further object of this invention is to provide a vehicle towing means which is readily mounted between a towing vehicle and a towed vehicle, such as a golf cart, in order to elevate a portion of the golf cart assembly for ease of trailing behind the towing vehicle and having numerous safety features thereon to assure compliance with state and federal towing regulations.

Another object of this invention is to provide a vehicle towing means which can be easily attached between a towing vehicle and a golf cart assembly requiring a minimum amount of effort to do so and having a main actuator assembly which is readily operable to raise and lower a wheel and axle assembly of the golf cart assembly for ease of trailing.

Still, one other object of this invention is to provide a vehicle towing means which is economical to manufacture; easy to install between towing and towed vehicles; readily usable to raise a portion of a towed vehicle for efficient trailing; and substantially maintenance free.

Various other objects, advantages, and features of the invention will become apparent to those skilled in the art from the following discussion, taken in conjunction with the accompanying drawings, in which:

FIGURES OF THE INVENTION

FIG. 1 is a perspective view of the vehicle towing means of this invention;

FIG. 2 is an enlarged fragmentary sectional view taken along line 2—2 in FIG. 1;

FIG. 3 is a side elevational view thereof;

FIG. 4 is a side elevational view illustrating a first step of mounting the vehicle towing means between a towing vehicle and a golf cart assembly;

FIG. 5 is a view similar to FIG. 4 illustrating a second step of mounting the vehicle towing means between the towing vehicle and the golf cart assembly; and FIG. 6 is a view similar to FIG. 5 illustrating a third step after operation of a main actuator assembly in order to raise a wheel and axle assembly of the golf cart assembly prior to a towing operation.

The following is a discussion and description of preferred specific embodiments of the vehicle towing means of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail, and in particular to FIG. 4, a vehicle towing means of this invention, indicated generally at 12, is shown as positioned between a towing vehicle 14 and a towed vehicle 16. The towing vehicle 14 has a rear bumper member 18 to which is attached a ball hitch assembly 20 having an anchored hitch ball member 22.

The towed vehicle 16 is illustrated herein as being a golf cart assembly 24 having a passenger section 26, a front wheel and axle assembly 28, a rear wheel and axle assembly 30, and a bumper support frame 32.

The bumper support frame 32 is of a conventional nature to which a towed vehicle connector member 40 can be mounted as will be described hereinafter to provide sufficient strength for towing the golf cart assembly 24.

As best shown in FIG. 1, the vehicle towing means 12 includes 1) a main support assembly 34 which is releasably connectable to the ball hitch assembly 20 of the towing vehicle 14; 2) a connector linkage assembly 36 which is pivotally connected to the main support assembly 34; 3) a main actuator assembly 38 which is mounted between the main support assembly 34 and the connector linkage assembly 36 for pivotal movement of the connector linkage assembly 36; and 4) the towed vehicle connector member 40 which is anchored to the bumper support frame 32 of the golf cart assembly 24 and releasably connectable to the connector linkage assembly 36.

The main support frame assembly 34 includes a support frame assembly 42 having a hitch connector assembly 44 secured to a forward portion thereof. The support frame assembly 42 includes 1) a forward support member 46; 2) an intermediate support frame 48 connected to the the forward support member 46; and 3) a rearward support frame 50 secured to the intermediate support frame 48.

The intermediate support frame 48 includes a lower parallelogram support assembly 52 having a vertical support assembly 54 secured thereto.

As shown in FIG. 3, the lower parallelogram support assembly 52 includes parallel upper and lower support tubes 56, 58 and spaced inclined parallel support tubes 60, 62 mounted between the upper and lower support tubes 56, 58.

The vertical support assembly 54 includes vertical strut members 64, 66 having upper end portions 68 and lower end portions 70. The upper end portions 68 are interconnected and the lower end portions 70 are secured to an upper surface of the upper support tube 56 to provide substantial rigidity thereto.

It is noted that the forward support tube 46; the upper and lower support tubes 56, 58; the spaced inclined support tubes 60, 62; and the vertical strut members 64, 66 are preferably constructed of a steel tubular material being of square or rectangular shape in transverse cross section so as to present substantial strength and rigidity necessary for a towing operation.

The rearward support frame 50 includes spaced parallel support plates 72, 73 secured as by welding to opposite outer vertical sides of the upper support tube 56. The support plates 72, 73 are each provided with opposed aligned pivot openings 74 and lock openings 76 for reasons to be explained.

The hitch connector assembly 44 is of a conventional nature having a hitch housing 78, a ball receptacle member 80 connected to the hitch housing 78 to receive the hitch ball member 22 of the towing vehicle 14 therein, and a hitch actuator lever 82 which is operable to move the ball receptacle member 80 into 1) an attached locked condition; or 2) a released condition for removing the hitch connector assembly 44 from the hitch ball member 22 of the towing vehicle 14.

The connector linkage assembly 36 includes 1) a linkage tube member 84 constructed of steel tubular material being of square shape in transverse cross section; 2) a connector assembly 86 pivotally connecting the linkage tube member 84 to the parallel support plates 72, 73; and 3) spaced parallel actuator support lugs 88 secured to an upper surface of the linkage tube member 84.

As shown in FIG. 3, the linkage tube member 84 is provided with parallel vertical side walls 89 integral with a top wall 91 and a bottom wall 93. The linkage tube member 84 is provided in the parallel side walls 89 with aligned linked pivot holes 90, link lock holes 92, and hitch anchor holes 94 for reasons to be explained.

The connector assembly 86 includes a pivot bolt and nut member 96 mounted through the pivot opening 74 and the pivot holes 90 to permit pivotal movement of the linkage tube member 84 relative to the support plates 72, 73. A lock pin member 98 is selectively mounted through the lock openings 76 and the link lock holes 92 to prevent pivotal movement of the linkage tube member 84 about the pivot bolt and nut member 96 for reasons to be explained.

The lock pin member 98 is provided with a lock detent member 102 operable to hold in the anchored condition when the linkage tube member 84 is aligned with the support plates 72, 73 in a towing operation.

The parallel actuator support lugs 88 are welded to the top wall 91 of the linkage tube member 84 and having aligned lug connector holes 104 to receive a support nut and bolt member 105 therethrough.

The main actuator assembly 38 includes 1) an actuator support housing 106 which is pivotally connected to a junction of the upper end portions 68 of the vertical strut members 64, 66; and 2) a hitch actuator assembly 108 which is secured at an upper end to the actuator support housing 106 and pivotally connected at a lower end to the actuator support lugs 88 on the connector linkage assembly 36.

The actuator support housing 106 includes a U-shaped channel member 110 having spaced aligned actuator pivot holes 112 through which is attached a bolt and nut member 114 for pivotal movement thereabout.

The hitch actuator assembly 108 includes 1) a first movable screw housing 116 having one end pivotally connected to the support nut and bolt member 105 connected to the actuator support lugs 88; 2) a second stationary screw housing 118 mounted about the first movable screw housing 116 and having an upper end secured as by welding to the support housing 106; and 3) an actuator screw assembly 120 connected to and mounted between the first movable screw housing 116 and the second stationary screw housing 118.

The first movable screw housing 116 includes an actuator nut member 122 with a threaded opening 124 being secured to an upper end thereof.

The second stationary screw housing 118 includes an end plate member 126 having an anchor opening 127 and being secured to an upper end thereof.

The actuator screw assembly 120 includes an elongated screw member 128 having an actuator handle assembly 130 secured to an upper outer end thereof. The elongated screw member 128 is provided with a threaded main body 132 having a connector member 134 secured to an upper end and a stop lug member 136 on a lower opposite end thereof.

As noted in FIG. 2, the threaded main body 132 is extended through the threaded opening 124 in the actuator nut member 122 of the first movable screw housing 116. An outer end of the threaded main body 132 has the stop lug member 136 secured thereto which would abut the actuator nut member 122 to limit axial movement of the first movable screw housing 116.

The actuator handle assembly 130 includes a pivot pin member 138 secured to an outer end of the end connector member 134 and having a handle member 140 mounted thereon.

The handle member 140 has a laterally extended handle bar 142 for ease of grasping in a conventional manner and rotating the interconnected actuator handle assembly 130 and the elongated screw member 128 in a manner to be described.

The towed vehicle connector member 40 includes a support anchor tube 144 of square shape in transverse cross section having a square opening 146 and with aligned lock pin openings 148 in spaced side walls 149.

The square opening 146 is adapted to receive an outer end of the linkage tube member 84 therein to be releasably secured thereto through the use of a lock pin member 98 extended through the lock pin openings 148 and the hitch anchor holes 94.

USE AND OPERATION OF THE INVENTION

In the use and operation of the vehicle towing means 12 of this invention, the first step would be to attach the towed vehicle connector member 40 to the golf cart assembly 24 and, more specifically, to the bumper support frame 32. This connection can be achieved as by welding or bolting which is well known in the prior art.

The next step is to remove the lock pin member 98 from the lock openings 76 and link lock holes 92 and use the main actuator assembly 38 on rotation of the actuator screw assembly 120 so as to achieve the condition as noted in FIG. 3.

As shown in FIG. 4, the vehicle towing means 12 is placed between the towing vehicle 14 and the towed vehicle 16 whereupon the linkage tube member 84 is inserted into the square opening 146 of the towed vehicle connector member 40 of the towing vehicle 14 as noted by arrow 154. A lock pin member 98 is inserted through the aligned hitch anchor holes 94 and the lock pin openings 148 to achieve a secure locked condition therebetween.

Next, the golf cart assembly 24 can be moved rearwardly under its own power in a direction opposite that of the arrow 154 whereupon the hitch connector assembly 44 is placed on the hitch ball member 22 of the towing vehicle 14 as noted by arrow 156 in FIG. 5. Subsequently, the hitch actuator lever 82 can be operated to secure the ball receptacle member 80 to the hitch ball member 22.

The next step is to utilize the main actuator assembly 38 and, more particularly, the hitch actuator assembly 108 whereupon the actuator handle assembly 130 is rotated to rotate the elongated screw member 128 to cause downward movement of the first movable screw housing 116 as noted by an arrow 150 in FIG. 3.

The actuator handle assembly 130 is rotated until the linkage tube member 84 comes into axial alignment with the spaced parallel support plates 72, 73 as noted in FIGS. 1 and 6. On reaching this extended condition, the rear wheel and axle assembly 30 of the golf cart assembly 24 has been raised above a support surface 157 to the condition as noted in FIG. 6.

The next step is insert a lock pin member 98 through the aligned lock openings 76 and link lock holes 92 to achieve a rigid condition between the now interconnected linkage tube member 84 and the support plates 72, 73.

In this condition, we are now in a position to tow the golf cart assembly 24 by the towing vehicle 14 to any desired location. On reaching the desired location, it is noted that obvious reverse steps may be taken in order to release the golf cart assembly 24 from the towed vehicle connector member 40 and the hitch connector assembly 44 from the hitch ball member 22 of the towing vehicle 14.

It is seen that the vehicle towing means of this invention is easy to mount between a towing vehicle and a towed vehicle; lightweight so can be handled by a single person for usage thereof; rigid in construction for safety reasons; economical to manufacture; and substantially maintenance free.

While the invention has been described in conjunction with preferred specific embodiments thereof, it will be understood this description is intended to illustrate and not to limit the scope of the invention, which is defined by the following claims.

I claim:

1. A vehicle towing means connectable between a towing member and a towed member, comprising:
   a) a main support assembly being of a rigid, non-pivotal construction releasably connectable to a towing member;
   b) a connector linkage assembly having one end pivotally connected to said main support assembly and another end releasably connected to the towed member;
   c) a main actuator assembly mounted between and pivotally connected to said main support assembly and said connector linkage assembly;
   d) said main actuator assembly includes a hitch actuator assembly operable to raise and lower a portion of said connector linkage assembly and the towed member for a towing operation;
   e) said main support assembly includes a support frame assembly having a hitch connector assembly mounted thereto;
   f) said main support frame assembly includes a forward support member connected to said hitch connector assembly, an intermediate support frame connected to a rearward portion of said forward support member, and a rearward support frame connected to said intermediate support frame and pivotally connected to said connector linkage assembly; and
   g) said hitch connector assembly releasably connected to the towing member.

2. A vehicle towing means as described in claim 1, wherein:
   a) said connector linkage assembly includes a lock pin member mounted within aligned openings in said main support assembly and said connector linkage assembly to securely anchor same to each other for a towing operation and prevent relative movement thereof and rendering said hitch actuator assembly inoperative during the towing operation.

3. A vehicle towing means connectable between a towing member and a towed member, comprising:
   a) a main support assembly releasably connectable to a towing member;
   b) a connector linkage assembly having one end pivotally connected to said main support assembly and another end releasably connected to the towed member;
   c) a main actuator assembly mounted between and pivotally connected to said main support assembly and said connector linkage assembly;
   d) said main actuator assembly includes a hitch actuator assembly operable to raise and lower a portion of said connector linkage assembly and the towed member for a towing operation;
   e) said main support assembly includes a support frame assembly having a hitch connector assembly mounted thereto;
   f) said main support frame assembly includes a forward support member connected to said hitch connector assembly, an intermediate support frame connected to a rearward portion of said forward support member, and a rearward support frame connected to said intermediate support frame and pivotally connected to said connector linkage assembly;
   g) said hitch connector assembly releasably connected to the towing member; and
   h) said intermediate support frame includes a lower parallelogram support assembly connected to a vertical support assembly constructed of tubular material providing a rigid interconnection between the towing member and said connector linkage assembly.

4. A vehicle towing means as described in claim 3, wherein:
   a) said connector linkage assembly includes a linkage tube member having one end pivotally connected to said support frame assembly and an outer end selectively releasably connected to the golf cart assembly; and
   b) said connector linkage assembly includes a pivot member for attaching to said main support assembly and having a lock pin member mounted through said linkage tube member and said support frame assembly to anchor in a selected aligned position for a towing operation.

5. A vehicle towing means releasably connectable between a towing vehicle and a golf cart assembly, comprising:
   a) a main support assembly being of a rigid, non-pivotal construction connected at one end to the towing vehicle;
   b) a connector linkage assembly pivotally connected at one end to an opposite end of said main support assembly and connected at an opposite end to the golf cart assembly;
   c) a main actuator assembly connected between said main support assembly and said connector linkage assembly and operable to raise and lower a portion of the golf cart assembly;
   d) lock means to connect to said main support assembly and said connector linkage assembly to anchor in the raised condition of the golf cart assembly for a safe towing operation; and
   e) said main support assembly includes an intermediate support frame having a lower parallelogram assembly connected to a vertical support assembly providing a rigid interconnection between the towing member and said connector linkage assembly.

6. A vehicle towing means as described in claim 5, wherein:
   a) said main support assembly includes an intermediate support frame having a lower parallelogram assembly connected to a vertical support assembly providing a rigid interconnection between the towing member and said connector linkage assembly.

7. A vehicle towing means as described in claim 5, wherein:
   a) said connector linkage assembly includes a lock pin member mounted within aligned openings in said main support assembly and said connector linkage assembly to securely anchor same to each other for a towing operation.

* * * * *